United States Patent
Tiyyagura

(10) Patent No.: US 7,941,421 B2
(45) Date of Patent: *May 10, 2011

(54) UNSUPERVISED DETECTION OF WEB PAGES CORRESPONDING TO A SIMILARITY CLASS

(75) Inventor: Mahesh Tiyyagura, Hyderabad (IN)

(73) Assignee: Yahoo! Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/716,195

(22) Filed: Mar. 2, 2010

(65) Prior Publication Data

US 2010/0161588 A1 Jun. 24, 2010

Related U.S. Application Data

(63) Continuation of application No. 11/955,129, filed on Dec. 12, 2007, now Pat. No. 7,707,229.

(51) Int. Cl.
*G06F 17/30* (2006.01)
(52) U.S. Cl. .......................... 707/709; 707/737; 715/234
(58) Field of Classification Search .................. 707/709, 707/802, 999.1, 737, 749, 999.003, 999.107; 715/234
See application file for complete search history.

(56) References Cited

U.S. PATENT DOCUMENTS

| | | | |
|---|---|---|---|
| 6,119,124 A | | 9/2000 | Broder et al. |
| 6,349,296 B1 * | | 2/2002 | Broder et al. ........................ 1/1 |
| 2006/0112089 A1 | | 5/2006 | Broder et al. |
| 2008/0168061 A1 * | | 7/2008 | Liu et al. ............................ 707/7 |
| 2009/0049062 A1 * | | 2/2009 | Chitrapura et al. ........... 707/100 |
| 2009/0157607 A1 | | 6/2009 | Tiyyagura |

OTHER PUBLICATIONS

Bar-Yossef, Z., Broder, A., Kumar, R., Tomkins, A. (2004), "Sic transit gloria telae: towards an understanding of the web's decay", Proceedings of the 13th International Conference on World Wide Web (WWW), pp. 328-337.
Buttler, D., "A Short Survey of Document Structure Similarity Algorithms," Mar. 5, 2004, The 5th International Conference on Internet Computing, Las Vegas, NV, United States, Jun. 21, 2004 through Jun. 24, 200, 9 pages.
Broder et al., "Syntactic Clustering of the Web," SRC Technical Note, 1997-015, Jul. 25, 1997, 13 pages.
U.S. Notice of Allowance mailed Jan. 27, 2010 in U.S. Appl. No. 11/955,129.

* cited by examiner

*Primary Examiner* — Cheryl Lewis
(74) *Attorney, Agent, or Firm* — Weaver Austin Villeneuve and Sampson LLP

(57) ABSTRACT

A method of detecting web pages belonging to at least one similarity class from a plurality of web pages includes determining clusters of the plurality of web pages based on characteristics of the content of the web pages. For each of the determined clusters, at least one metric is determined indicative of similarity among resource locators associated with the web pages of that cluster. A determination of web pages belonging to the at least one similarity class is based on the determined clusters and the determined similarity metrics.

22 Claims, 3 Drawing Sheets

US 7,941,421 B2

UNSUPERVISED DETECTION OF WEB PAGES CORRESPONDING TO A SIMILARITY CLASS

CROSS-REFERENCE TO RELATED APPLICATIONS

The present application is a continuation and claims priority under 35 U.S.C. 120 to U.S. Non-Provisional patent application Ser. No. 11/955,129, U.S. Pat. No. 7,707,229,filed Dec. 12, 2007 entitled "UNSUPERVISED DETECTION OF WEB PAGES CORRESPONDING TO A SIMILARITY CLASS" to Mahesh Tiyyagura. This application is incorporated in its entirety by reference as if fully set forth herein.

BACKGROUND

It is well known to request a web page according to a Universal Resource Locator (URL). More particularly, when a web page corresponding to a particular URL is requested using an HTTP request, a service (e.g., a web site) associated with that URL provides, in response, web page content nominally associated with that URL. When the destination server for the service cannot fulfill the request, an HTTP standard error response code "404" may be returned. Typically, the client application (e.g., browser) interprets the 404 response code and provides a default message generated by the client application. URL's that lead to such 404 response codes are sometimes known as "dead links."

More recently, the services themselves (by contrast to the client applications) have taken to providing an HTTP standard response code 200 (OK code), as opposed to an HTTP standard error response code 404, even when a web page corresponding to a dead link URL is requested. In addition, these services generally provide a default page that indicates (to a human user) that the client application requested a web page corresponding to a dead link. This type of response has become known as a "soft 404."

To an automated process, the default page indicating that the requested web page corresponds to a dead link generally appears to be responsive and not indicative of a dead link. Thus, for example, unless a search engine accounts for it, the search engine may treat a web page corresponding to a soft 404-type dead link as an actual live web page, which can affect search results in what are probably unintended ways. Types of processing other than processing used by search engines can also benefit from knowledge of soft 404-type dead links.

According to one article, "Sic transit gloria telae: towards an understanding of the web's decay", by Z Bar-Yossef et al. (2004), it is estimated that soft 404s account for more than twenty-five percent of the dead links on the web. The Z Bar-Yossef article proposes a method to detect whether a particular web page is a soft 404 page.

SUMMARY

A method of detecting web pages belonging to at least one similarity class from a plurality of web pages includes determining clusters of the plurality of web pages based on characteristics of the content of the web pages. For each of the determined clusters, at least one metric is determined indicative of similarity among resource locators (e.g., URLs) associated with the web pages of that cluster. A determination of web pages belonging to the at least one similarity class is based on the determined clusters and the determined similarity metrics.

The determination of web pages belong to the at least one similarity class may be made without generating extra web page requests. Furthermore, various similarity classes may be determined, such as a soft 404 similarity class and other classes of "standard" web pages provided by a domain in view of varied resource locator requests.

DETAILED DESCRIPTION

The inventor has realized the desirability of detecting soft 404 web pages without generating extra web page requests. In accordance with one aspect, to detect soft 404 pages of a plurality of web pages, clusters are determined of the plurality of web pages based on characteristics of the content of the web pages, such as web page structure. In general, given that the soft 404 pages are generally similar to each other, and different from non-soft 404 pages, they form a separate cluster or clusters.

To determine which of the clusters includes the soft 404 pages, metrics are determined indicative of similarity among resource locators associated with the plurality of the web pages of each cluster. The cluster including the soft-404 web pages is determined based on the clusters and the determined similarity metrics (generally, where the determined similar metric for a cluster indicate dissimilarity of the resource locaters associated with the web pages of that cluster).

The inventor has also realized the desirability of detecting pages belonging to other "similarity classes" as well, such as, for example, pages that indicate "out of stock," "program exception," "permission denied" and "login required." Detection of such web pages belonging to these other similarity classes may be like that discussed above with respect the similarity class of soft 404 pages.

Figure 1:
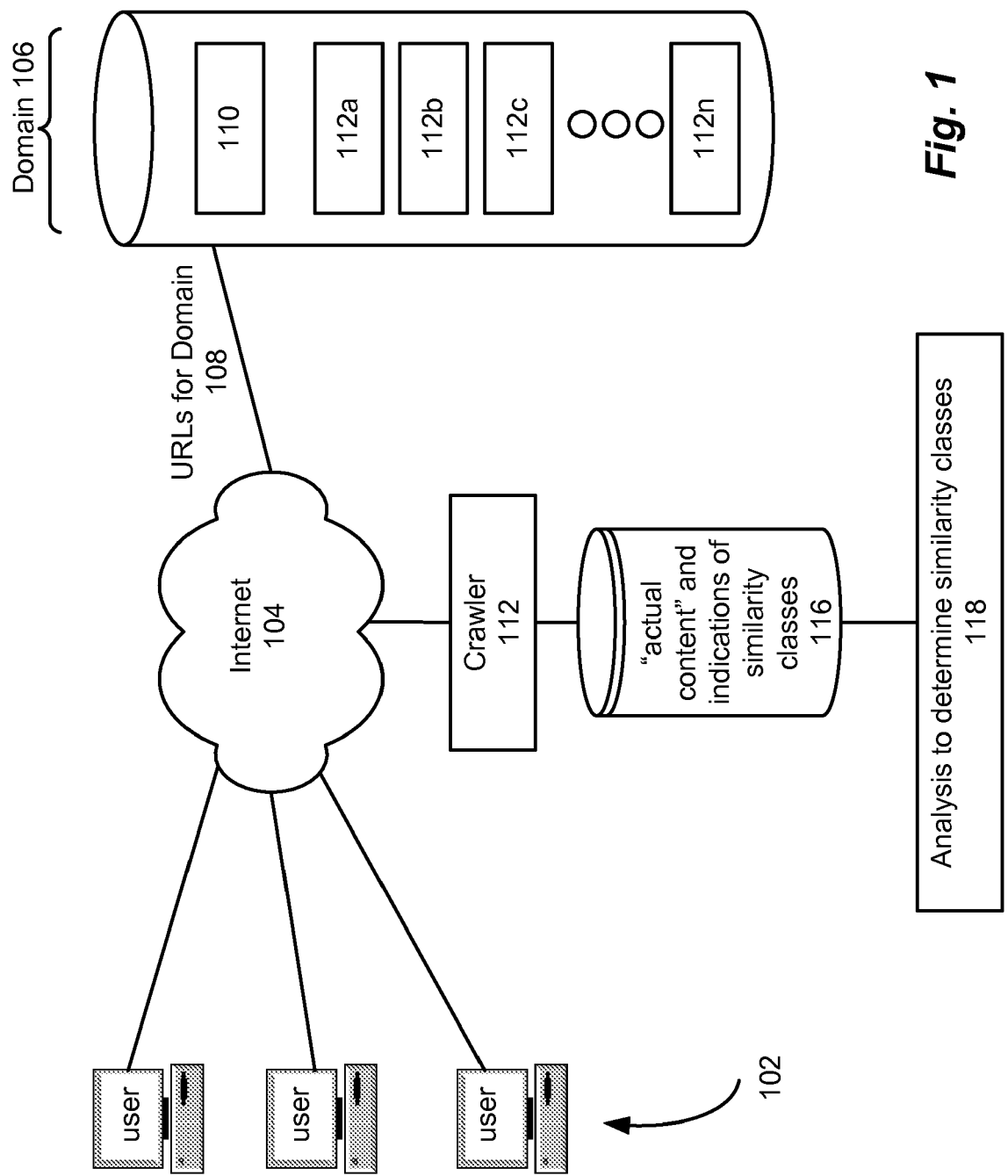
FIG. 1 is an architecture diagram that broadly illustrates an environment in which such similarity classes exist and may be detected.

FIG. 1 is an architecture diagram that broadly illustrates an environment in which such similarity classes exist and may be detected. Referring to FIG. 1, a "domain" 106 exists on the world wide web, such that when access requests having a domain identification in the universal resource locator (URL) match to that domain, the access requests are directed to one or more web servers associated with that domain. In the FIG. 1 example, the domain 106 is accessible via a network 104 (such as the internet) by users 102. For example, access requests 108 (such as HTTP access requests) may be generated by browser programs executed by computing devices with which the users 102 are interacting. For example, the domain may correspond to "cnn.com" and the users 102 may be interacting with their browsers to cause access requests to be generated including URLs such as http://www.cnn.com/video/#/video/world/2007/10/18/sweeney.barham.sale-h.intv.cnn, which may be a URL for which the domain corresponding to cnn.com can fulfill the access request in a normal manner. In FIG. 1, web pages returned for URLs for which a domain cannot fulfill an access request in a normal manner are generally indicated by the reference numeral 110. Web pages for other URLs, for which the domain cannot fulfill an access request in a normal manner, the domain instead provides a "soft 404" response web page (or a web page corresponding to some other similarity class). These URLs are indicated in FIG. 1 by a reference numeral 112*x*, where "x" is unique for each similarity class of web pages, and are collectively indicated in FIG. 1 by a reference numeral 112.

These other URLs that result in soft 404 pages may, for example, be out of date, considering that web sites may be in a constant state of flux, and the URL may have been one for which, at one time, the domain could fulfill an access request (and, for example, was provided as a link from a web page of another domain or even from a web page within the same domain). As another example, the URL may be one for which the domain could never have fulfilled the access request (and, for example, was provided as a link from another domain or from within the same domain, but was mistyped). The characterization herein of URLs that result in a soft 404 response is meant to be illustrative only, and is not meant to be exhaustive.

As mentioned above, the soft 404 response web pages may be more broadly thought of as belonging to one of a "similarity class" of web pages that return similar content. In can be inferred, from the fact that dissimilar access requests (i.e., with dissimilar URLs) return similar content, that those similar web pages are not generated by normally fulfilling an access request. That is, it can be inferred that there is some special (and similar) processing involved in generating such web pages, whether an inability to fulfill the request or some other special processing.

Returning now specifically to FIG. 1, the reference numerals 112*a*, 112*b*, 112*c*, . . . , 112*n* indicate various similarity classes of URL's. For example, similarity class 112*a* may be URLs that correspond to soft 404 web page content. Other similarity classes (generically, 112) may be for URLs of access requests that result in web pages indicating "login required," "permission denied," "program exception" and "out of stock" (e.g., for an e-commerce web site) pages.

FIG. 1 further illustrates a web crawler 112 that browses the web automatically, generating web accesses and receiving corresponding web page content. Web crawlers are known as used, for example, by search engines to visit numerous web pages. Other methods may be used as well to generate web accesses and receive corresponding web pages content. The received web page content 114 is saved in storage 116 for processing, such as generating an index usable by a search engine in responding to search queries.

An analysis process 118 processes the received web page content 114 saved in storage 116. More specifically, the analysis process 118 includes processing to determine similarity classes of the web pages, including processing to cluster web pages based on characteristics of the web page content. In one example, the clustering of the analysis process 118 is generally for web pages that result from access requests corresponding to a particular domain. The processing to determine similarity classes of the web pages further includes processing to determine which clusters, if any, are clusters of web pages of a similarity class.

Having determined which cluster or clusters correspond to a similarity class, the web page content in storage 116 is indicated with a result of the determination. Such an indication can have various uses. In general, any process that uses the web page content 114 in storage 116 can know that, for particular web pages and/or corresponding resource locators, that web page and corresponding resource locator does not pertain to generally useful information. As another example, a process to implement a link-based ranking algorithm can decay the ranks of such web pages and of pages that link to pages of a similarity class. As another example, for processes that estimate the freshness of web pages, the freshness estimate can be decayed based on linking to pages of a similarity class such as a soft 404 similarity class. For advertisement targeting processes, it can be assumed that a user would be rather inclined to navigate away from a page of a similarity class. Therefore, pages of a similarity class may be served more generic advertisements, and advertisements may be served that occupy more screen real estate than for other pages.

Figure 2:
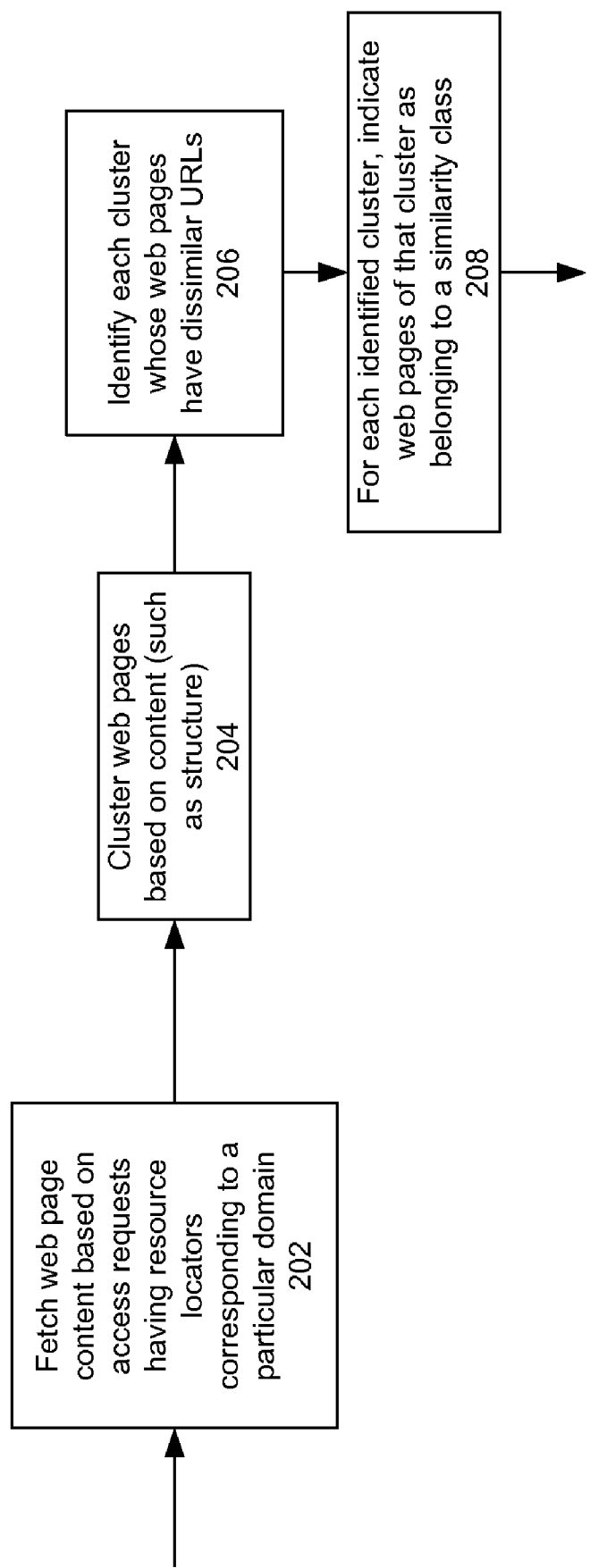
FIG. 2 is a flowchart illustrating a method of detecting similarity classes of web pages returned for resource locators corresponding to a particular domain.

Having generally described an architecture of an environment in which similarity classes exist and may be detected, we now broadly describe, with reference to the flowchart of FIG. 2, a method of detecting similarity classes of web pages returned for resource locators corresponding to a particular domain. Turning to FIG. 2, at step 202, web page content is fetched based on access requests having resource locators corresponding to a particular domain. At step 204, the web pages are clustered using an unsupervised clustering algorithm. Clustering of web pages is known. For example, the paper entitled "Syntactic Clustering of the Web," by Broder et al., describes clustering using shingling, to determine near-duplicate clusters. In general, any technique that clusters based on content similarity/dissimilarity may be acceptable. Using a shingling technique, in particular, web pages whose similarity measure is above a particular threshold may be clustered together. See, also, U.S. Pat. No. 20060112089 "Methods and apparatus for assessing web page decay" by Broder; Andrei Zary; et al and U.S. Pat. No. 6,119,124, entitled "Method for Clustering Closely Resembling DataObjects" by Andrei Broder, Steve Glassman, Greg Nelson, Mark Manasse, and Geoffrey Zweig.

At step 206, one or more clusters are identified for which, for the cluster, the web pages of that cluster have dissimilar corresponding resource locators. Dissimilarity may be in view of a particular threshold, for example. For example, having clustered web pages together, step 206 may include processing, for each cluster of web pages, to determine metrics indicative of similarity among resource locators of access requests to which the web pages of that cluster correspond. Various methods of determining such similarity-indicative metrics may be employed. One such method employs, for each cluster, determining tokens of the resource locators of the access requests for web pages of that cluster, and determining a similarity-indicative metric based on those determined tokens. For example, the similarity-indicative metric for a cluster may be an indication of the distribution of distinct values assumed by tokens for the web pages of that cluster.

For example, a similarity-indicative metric, for a cluster, based on determined tokens may be based on entropy determined for every token. In general, the entropy is an indication of how much randomness there is in values of a set of elements. The entropy is high when the values are highly random, and the entropy is lower when the values are biased. There are various methods of determining randomness/disorder in URL keys, a few of which are discussed below in conjunction with an example.

Furthermore, having determined the metrics indicative of similarity among resource locators of access requests to which the web pages of each cluster correspond, clusters whose metric indicates (either in isolation or relative to the metrics for other clusters) that the resource locators for that cluster are dissimilar, such as dissimilar above a particular threshold, are inferred to be clusters whose web pages are in a similarity class.

At step 208, the web pages of each such cluster, i.e., a cluster inferred to be clusters whose web pages are in a similarity class, are so indicated. As a result, the fetched web page content may be processed (by an indexer or other processing, for example) in view of the similarity class indication or indications.

We now describe, with respect to example resource locator URLs, a specific example of the FIG. 2 processing. In the specific example, it is assumed that the following web page clusters have been determined for a domain corresponding to "go.com."

Cluster:1
www.go.com/
   showpage.do?section=sports&subsection=football&pageid=1
www.go.com/
   showpage.do?section=sports&subsection=football&pageid=2
www.go.com/
   showpage.do?section=sports&subsection=football&pageid= . . .

Cluster:2
www.go.com/
   showpage.do?section=sports&subsection=snooker&pageid=1
www.go.com/
   showpage.do?section=sports&subsection=snooker&pageid=2
www.go.com/
   showpage.do?section=sports&subsection=snooker Cluster:3
www.go.com/
   showpage.do?section=finance&subsection=stocks&pageid=1
www.go.com/
   showpage.do?section=finance&subsection=stocks
www.go.com/
   showpage.do?section=finance&subsection=stocks&pageid= . . .

Cluster:4
www.go.com/
   showpage.do?section=finance&subsection=mutualfunds&pageid=1
www.go.com/
   showpage.do?section=finance&subsection=mutualfunds&pageid=2
www.go.com/
   showpage.do?section=finance&subsection=mutualfunds Cluster:5 <Soft404 Cluster>
www.go.com/
   showpage.do?secon=finance&subsection=mutualfunds&pageid=1
www.go.com/
   showpage.do?section=fin&subsection=mutualfunds
www.go.com/
   showpage.do?section=sports&subsection=&pageid=1
www.go.com/
   showpage.do?section=finance&subsection=mutufunds&pageid= . . .
www.go.com/
   showpage.do?section=sports&subsection=ker&pageid=1
www.go.com/
   showpage.do?section=finance&subsection=mfunds
www.go.com/
   showpage.do?section=&subsection=mutualfunds&pageid=2000

As discussed above, a cluster of soft 404 pages (or pages of any similarity class) may be inferred by analyzing features of the resource locators used to access the pages. In the example, the features used in the analysis are URL tokens generated from the host-name, static path, script name, and query-args. Below is an example URL and an example of corresponding tokens:

http://finance.yahoo.com/nasdaq/charts/search.asp?ticker=
|..........host-name...........|......static......|....script....|.........
                                                 YHOO&start=mon&end=thu
                                                ..........query-args.............|

Features corresponding to the above URL and their values are shown below:
hostname_0: com
hostname_1: yahoo
hostname_2: finance
static_path_0: nasdaq
static_path_1: charts
script_name: search.asp
dynticker: YHOO
dyn_start: mon
dyn_end: thu Again, it may be inferred from the distribution of URL features that a cluster is a similarity cluster. (Here, the term "similarity cluster" is being used as shorthand for a cluster whose web pages are members of a similarity class.) More particularly, in some examples, a cluster having a distribution of URL features that is different (e.g., different beyond a particular threshold) from the distribution of URL features in other clusters, generally, is inferred to be a similarity cluster (but considering, in some examples that other clusters may be similarity clusters as well).

Some tokens are noisy and, thus, it is preferable to not use these tokens as URL features with which to determine that a cluster is a similarity cluster. For example, dyn_pageid and host_name1 may be noisy features that are not used. On the other hand, dyn_section may be a non-noisy feature that is used. In one example, the information gain for each URL key is computed, and only keys in the third quartile of information gain are used as features to determine similarity classes.

Entropy may be considered to be a measure of distribution of features. Thus, in one example, given N clusters; C1, C2 . . . CN, having near duplicate web pages, the entropy is computed for every key (feature). E_i is the information gain for key K_i. In the example, all keys are identified for which E_i belongs to the $3^{rd}$ quartile. A similarity cluster is inferred to be, then, the cluster in which the distribution of distinct values assumed by the identified keys is very different from the distribution in other clusters (essentially, the cluster is an outlier).

To quantify this notion, in one example, we determine the entropy associated with selected keys for each cluster. In general, the entropies of selected keys in a Soft-404 cluster will be high, whereas the entropies of the selected keys will be low for non-Soft-404 clusters. Furthermore, KL divergence (Kullback-Leibler divergence) is a very popular measure employed to measure the difference between two probability distributions. The uniform distribution is considered as the reference distribution, and the KL divergence is computed for each chosen key in each cluster. The similarity cluster's KL divergence measures are outliers in the values obtained. Thus, similarity pages of a large web corpus can be detected/inferred very efficiently in an unsupervised fashion.

Looking at the specific example of the clusters above (Cluster 1 to Cluster 5) more closely, it can be seen that, for each of Cluster 1 to Cluster 4, the keys of "subsection" and "section" count for higher than average information gain (i.e., there are few distinct values for these keys within each cluster) which, for each cluster, minimizes the entropy for that cluster. With respect to Cluster 5, however, there is a greater distribution of distinct values taken by the keys within this cluster. As a result, the entropy for Cluster 5 is higher, and Cluster 5 is inferred to be a similarity cluster.

Having discussed some specific examples of processing to determine pages of a similarity class, we now discuss some generalizations of this processing. For example, it is noted that other content similarity metrics between two documents can be used to form the clusters of near duplicate web pages, not just shingling with respect to document structure. Furthermore, statistical measures other than KL divergence can be employed to infer that a particular cluster is a similarity cluster. Such statistical measures include, for example, a simple indication of the number of modes in the distribution.

Further, as mentioned above, the similarly classes are not limited to Soft 404 pages. Thus, additional processing may be employed to determine that a similarity cluster is a particular type of similarity class. The additional processing may include, for example, parsing the text of pages in a similarity cluster to infer the type of similarity class. For example, parsing the text of the pages may lead to inference of a similarity class of "Permission denied" or "Login required."

We have described a system/method to detect similarity classes in an unsupervised manner, including a system/method in which web pages are clustered into clusters of near-identical content, and resource locators of web pages of the clusters are analyzed to infer which cluster or clusters are similarity clusters.

Figure 3:
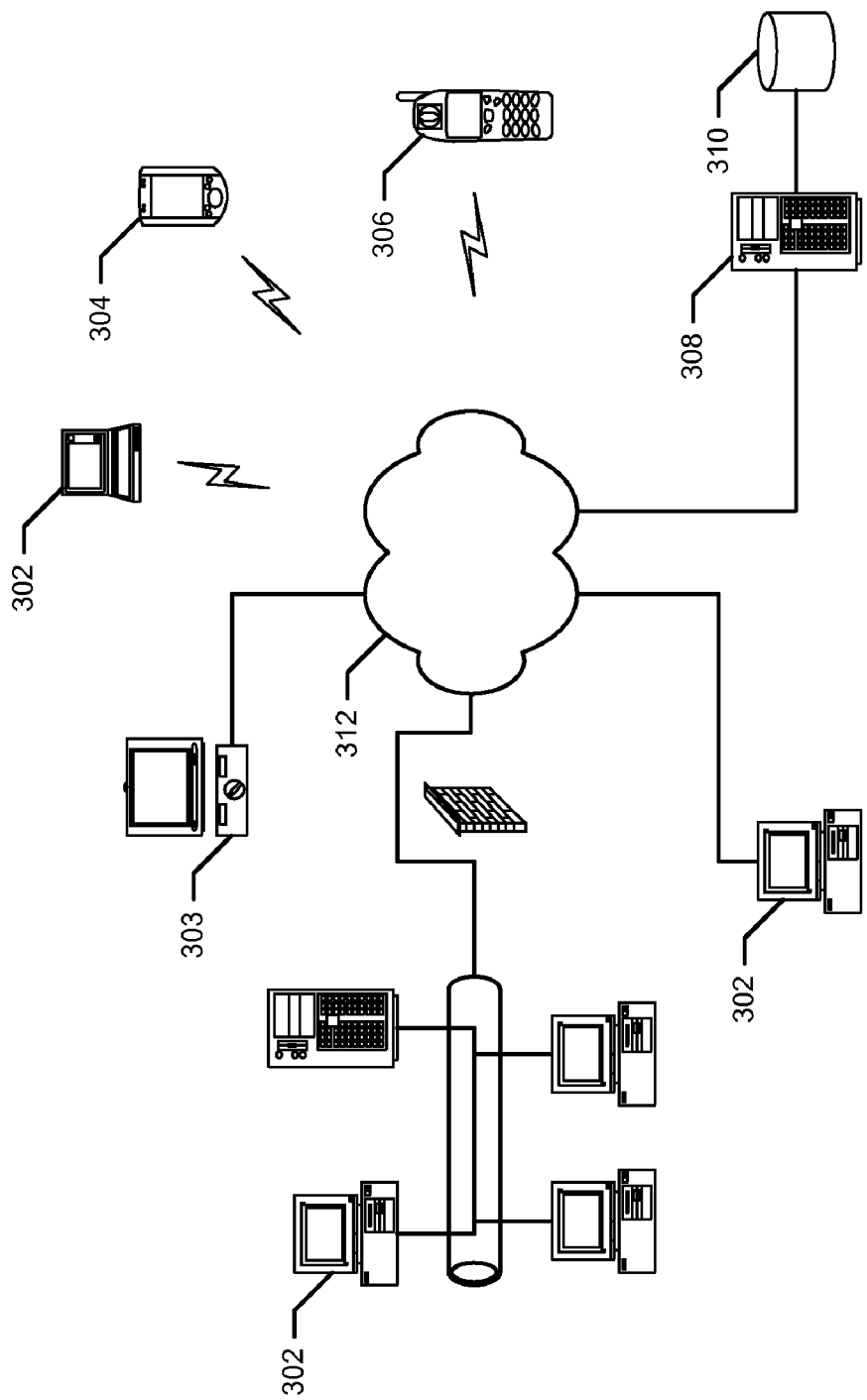
FIG. 3 is a simplified diagram of a network environment in which specific embodiments of the present invention may be implemented

Embodiments of the present invention may be employed to facilitate determination one or more similarity classes in any of a wide variety of computing contexts. For example, as illustrated in FIG. 3, implementations are contemplated in which a diverse network environment may be employed, using any type of computer (e.g., desktop, laptop, tablet, etc.) 302, media computing platforms 303 (e.g., cable and satellite set top boxes and digital video recorders), handheld computing devices (e.g., PDAs) 304, cell phones 306, or any other type of computing or communication platform.

According to various embodiments, a method of determining the similarity class such as described herein may be implemented as a computer program product having a computer program embodied therein, suitable for execution locally, remotely or a combination of both. The remote aspect is illustrated in FIG. 3 by server 308 and data store 310 which, as will be understood, may correspond to multiple distributed devices and data stores.

The various aspects of the invention may also be practiced in a wide variety of network environments (represented by network 312) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

What is claimed is:

1. A computer implemented method of operating a search system, the method comprising:

executing a crawl of a plurality of web pages;
analyzing results of the crawl and detecting web pages of the plurality belonging to at least one similarity class;
determining clusters of the plurality of web pages based on characteristics of the content of the web pages;
determining, for each of the determined clusters, at least one metric indicative of similarity among resource locators associated with the web pages of that cluster, wherein the metric indicative of similarity among resource locators is an entropy metric;
determining the web pages belonging to the at least one similarity class based on the determined clusters and the determined similarity metrics, including determining a cluster having web pages belonging to the at least one similarity class based on local entropy of selected keys of the resource locators for the web pages of that cluster and a statistical measure of the similarity metrics; and
making a notation, based at least in part upon the similarity class, for a web page and corresponding resource locator.

2. The method of claim 1, wherein the notation indicates that the web page and resource locator to which it corresponds does not pertain to generally useful information.

3. The method of claim 1, further comprising decaying a rank of a web page provided in response to a search query made of the search system based at least in part upon the notation.

4. The method of claim 1, further comprising decaying a freshness estimate for a web page and the corresponding resource locator based at least in part upon the notation.

5. The method of claim 1, further comprising decaying a rank of the web page and corresponding resource locator based at least in part upon the notation.

6. The method of claim 1, wherein:
the at least one similarity class is a plurality of similarity classes; and
the method further comprises, for each similarity class, characterizing that similarity class as distinct from the other similarity classes.

7. The method of claim 1, wherein:
the similarity metric for a cluster is an indication of statistical distribution of the resource locators for the web pages of that cluster.

8. The method of claim 1, wherein:
the statistical measure comprises a KL-divergence of the similarity metrics.

9. The method of claim 1, wherein:
the similarity class is soft 404.

10. The method of claim 1, wherein:
the similarity class is a class of web pages whose content indicates that a domain was not able to fulfill a web page request.

11. The method of claim 1, further comprising:
indicating the web pages belonging to the at least one similarity class as belonging to the at least one similarity class.

12. The method of claim 1, further comprising:
parsing web pages determined to belong to the at least one similarity class to identify the at least one similarity class.

13. The method of claim 1, further comprising:
indicating the web pages belonging to the at least one similarity class as belonging to the at least one similarity class; and
analyzing the plurality of web pages at least in part in view of the indications.

14. A computer program product for processing search queries and providing search results, the computer program product comprising at least one computer-readable medium having computer program instructions stored therein which are operable to cause at least one computing device to:

process a plurality of searches and detect web pages belonging to at least one similarity class from a plurality of web pages determine clusters of the plurality of web pages based on characteristics of the content of the web pages;

determine, for each of the determined clusters, at least one metric indicative of similarity among resource locators associated with the web pages of that cluster, wherein the metric indicative of similarity among resource locators is an entropy metric;

determine the web pages belonging to the at least one similarity class based on the determined clusters and the determined similarity metrics;

create an indication with a result of the determination; and fulfill a user initiated search query by making reference to the indication.

15. The computer program product of claim 14, wherein:
the computer program instructions include computer program instructions operable to decay a rank of a web page provided in response to the search query made of the search system based at least in part upon the indication.

16. The computer program product of claim 14, wherein:
the computer program instructions include computer program instructions operable to decay a freshness estimate for a web page and the corresponding resource locator based at least in part upon the notation.

17. The computer program product of claim 14, wherein:
the computer program instructions include computer program instructions operable to cause the at least one computing device to perform shingling on the web page content.

18. The computer program product of claim 14, wherein:
the at least one similarity class is a plurality of similarity classes; and
the computer program instructions are operable to cause the at least one computing device to further, for each similarity class, characterize that similarity class as distinct from the other similarity classes.

19. The computer program product of claim 14, wherein:
the similarity metric for a cluster is an indication of statistical distribution of the resource locators for the web pages of that cluster.

20. The computer program product of claim 14, wherein:
the similarity class is soft 404.

21. The computer program product of claim 14, wherein:
the similarity class is a class of web pages whose content indicates that a domain was not able to fulfill a web page request.

22. The computer program product of claim 14, wherein:
the computer program instructions are operable to cause the at least one computing device to further:
parse web pages determined to belong to at least one similarity class to identify the similarity class.

* * * * *